Patented Oct. 7, 1930

1,777,546

UNITED STATES PATENT OFFICE

HENRY BLUMENBERG, JR., OF LOS ANGELES, CALIFORNIA

FILTERING MATERIAL

No Drawing.   Application filed August 10, 1927.   Serial No. 212,131.

My invention relates to a composition of matter intended for use as a filtering material.

It is an object of this invention to provide a filtering material which has superior purifying, bleaching and germicidal properties. It is adapted for the purification, clarification and deodorizing of mineral oil distillates such as gasoline, kerosene and lubricating oils, but may also be used for the purification of water and industrial waste liquors and sewerage.

My invention consists of the composition of matter hereinafter described and claimed.

I take zinc sulphate $ZnSO_4.7H_2O$ which, as shown by the formula, is associated with seven molecules of water of crystallization. The zinc sulphate is now mixed with calcium hypochlorite $Ca(OCl)_2$. Both ingredients are ground to a fineness of 20–100 screen mesh. I take about 65 pounds of zinc sulphate and 35 pounds of calcium hypochlorite and add thereto from 10 to 30 pounds of inert cellular material, preferably ground to a fineness of about 20 to 100 screen mesh. Material suitable for this purpose is pumice, diatomaceous earth, charcoal, wood fibre, asbestos and the like. The cellular material and the mixture of zinc sulphate and calcium hypochlorite are agitated to form a homogeneous mass.

The zinc sulphate and calcium hypochlorite will not react in the dry state but only in the presence of water or when in contact with organic matter, producing calcium sulphate $CaSO_4$, zinc chloride $ZnCl_2$, and chlorine dioxide $ClO_2$. It is the chlorine dioxide which is the powerful oxidizing agent clarifying and deodorizing the liquids to be treated as well as destroying bacteria and germs.

One-half to five percent by weight of the filtering material thus prepared is usually sufficient for the clarification and deodorization of mineral oil distillates. For the purification of water 25 pounds of the filtering material to one million gallons of water is sufficient. It may be noted here that the chlorine dioxide in contra-distinction to the chlorine, which is sometimes used for water purification, leaves no disagreeable odor. The slight odor present resembles that of ozone.

In the treatment of industrial waste liquors and of sewerage from 100 to 500 pounds of the filtering material are usually required per one million gallons.

The liquids to be treated are either passed through a layer of the filtering material under pressure, or allowed to percolate by gravity.

Various changes may be made by those skilled in the art without departing from the spirit of my invention as claimed.

I claim:

1. A filtering material for use as a purifying, deodorizing and oxidizing agent, containing zinc sulphate, calcium hypochlorite, and an inert cellular material.

2. A filtering material for use as a purifying, deodorizing and oxidizing agent, containing zinc sulphate, calcium hypochlorite, and a diatomaceous earth.

3. A filtering material for use as a purifying, deodorizing and oxidizing agent, containing zinc sulphate, calcium hypochlorite, the proportions by weight being about two (2) parts of zinc sulphate to one (1) part of calcium hypochlorite, and an inert cellular material.

4. A filtering material for use as a purifying, deodorizing and oxidizing agent containing the following ingredients in approximately the proportions stated:

|  | Pounds |
|---|---|
| Zinc sulphate | 65 |
| Calcium hypochlorite | 35 |
| Diatomaceous earth | 10 to 30 |

In testimony whereof I have signed my name to this specification.

HENRY BLUMENBERG, JR.